United States Patent
Zhang et al.

(10) Patent No.: US 10,033,795 B2
(45) Date of Patent: *Jul. 24, 2018

(54) DEVICE AND METHOD FOR PROCESSING SLICE DATA

(71) Applicant: Beijing Qihoo Technology Company Limited, Beijing (CN)

(72) Inventors: Jiongxuan Zhang, Beijing (CN); Guofeng Fan, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/382,133

(22) Filed: Dec. 16, 2016

(65) Prior Publication Data

US 2017/0104810 A1     Apr. 13, 2017

Related U.S. Application Data

(63) Continuation of application No. 14/654,333, filed as application No. PCT/CN2013/082653 on Aug. 30, 2013, now Pat. No. 9,544,386.

(30) Foreign Application Priority Data

Dec. 19, 2012 (CN) .......................... 2012 1 0553468
Dec. 19, 2012 (CN) .......................... 2012 1 0555492

(51) Int. Cl.
*G06F 15/16* (2006.01)
*H04L 29/08* (2006.01)
*G06F 17/30* (2006.01)

(52) U.S. Cl.
CPC ........ *H04L 67/06* (2013.01); *G06F 17/30339* (2013.01); *G06F 17/30864* (2013.01); *H04L 69/329* (2013.01)

(58) Field of Classification Search
CPC ....................................................... H04L 67/06
(Continued)

(56) References Cited

U.S. PATENT DOCUMENTS

| | | | |
|---|---|---|---|
| 7,318,153 B2 * | 1/2008 | Shimizu | G06F 21/645 705/67 |
| 2003/0177253 A1 * | 9/2003 | Schuehler | H04L 43/18 709/230 |

(Continued)

*Primary Examiner* — Jason D Recek
(74) *Attorney, Agent, or Firm* — Harness, Dickey & Pierce, P.L.C.

(57) ABSTRACT

The present disclosure discloses a device and method for processing slice data. The method comprises: sending a download request for slice data adjacent to the newest continuous data to a server, determining whether or not a adjacent slice interval is filled with the slice data returned by the server; if yes, inserting the returned slice data into a database, setting the displaying mark thereof as valid, setting the displaying mark of downloaded data between the adjacent slice interval and the next slice interval to the adjacent slice interval as valid, and deleting the adjacent slice interval from the database; if not, inserting the returned slice data into the database, setting the displaying mark thereof as valid, and amending the border of the adjacent slice interval. The technical scheme of the present disclosure can obtain slice data from the server and fill the slice data in a corresponding slice interval according to a recorded slice interval set, and the data displayed to users is always the newest continuous data.

9 Claims, 11 Drawing Sheets

(58) Field of Classification Search
USPC .......................................................... 709/203
See application file for complete search history.

(56) References Cited

U.S. PATENT DOCUMENTS

| | | |
|---|---|---|
| 2004/0015516 A1 | 1/2004 | Harter et al. |
| 2006/0190724 A1* | 8/2006 | Adams ................ G06F 21/6218 713/166 |
| 2010/0217796 A1* | 8/2010 | Palthepu ............. H04L 67/1097 709/203 |
| 2012/0023506 A1 | 1/2012 | Maeckel et al. |
| 2012/0198234 A1 | 8/2012 | Chung et al. |

* cited by examiner

DEVICE AND METHOD FOR PROCESSING SLICE DATA

CROSS REFERENCE TO RELATED APPLICATIONS

This application is a continuation of U.S. application Ser. No. 14/654,333 filed Jun. 19, 2015, which is a National Phase of PCT/CN2013/082653 filed Aug. 30, 2013, which claims priority to Chinese Application No. 201210555492.1 filed Dec. 19, 2012 and Chinese Application No. 201210553468.4 filed Dec. 19, 2012. The entire disclosures of the above applications are incorporated herein by reference.

FIELD OF THE INVENTION

The disclosure relates to the field of network communication technology, particularly to device and method for processing slice data.

BACKGROUND OF THE INVENTION

With the popularization of intelligent terminals, reading client (hereinafter "client" for short in the present application) is increasingly applied to intelligent terminals. But so far, its major function part, data storage and slice data processing, is a relative core part with great technical difficulty and needs to be further optimized. This part is also very important in user experience of the client.

Reading data of the client comprises articles, pictures, videos, microblog and the like. In the course of using the client, a most common scene is: a user downloads reading data in a certain time period (e.g. during noon break) by means of the client. Generally, the client can obtain about 20 pieces of reading data and save them in database for displaying. After the user has read for a while, he will exit from the client and continue his own business. And then during another time period (e.g. six o'clock at dusk), the user enters the client again to download new reading data. Generally, considering data traffic, data transmission speed and user experience, the client will not request all reading data from the data downloaded last time (for example, during noon break mentioned before) to the data up to now. In this period, server might already have hundreds of pieces of reading data, thus the client will request only the newest about 20 pieces of reading data for the user. Thus, between the just requested 20 pieces of reading data and the 20 pieces of reading data requested before (e.g. during noon break) by the user there are some reading data that has not been downloaded to the client. The "hollow" part between the newest reading data and the prior reading data is called as "slice data".

A practice in the prior art is inserting the newly downloaded reading data directly in front of the prior reading data after downloading the new reading data, and displaying all of them, without considering whether or not there is slice data there between. As a result, the user cannot find out whether or not slice data exists between the displayed data, and cannot obtain slice data.

SUMMARY OF THE INVENTION

In view of aforesaid problem, the present disclosure is put forward to provide a slice data processing device and method to overcome aforesaid problem or at least partly solve aforesaid problem.

According to one aspect of the present disclosure, a device for processing slice data is provided, and the device comprises: a database unit, a display unit, a slice data download unit and a first database maintenance unit;

the database unit is configured to save data, the displaying mark of the data and slice interval set consisting of slice intervals corresponding to slice data, wherein the displaying mark of the newest continuous data is set as valid, and the displaying mark of the other data is set as invalid;

the display unit is configured to display data with the displaying mark being valid in the database unit;

the slice data download unit is configured to send, to a server, a download request for a certain amount of slice data adjacent to the newest continuous data in the database unit, and to receive the slice data returned by the server;

the first database maintenance unit is configured to determine whether or not the slice interval adjacent to the newest continuous data can be filled with the returned slice data; if yes, to insert the returned slice data into the database unit, to set the displaying mark of the returned slice data as valid, to set the displaying mark of downloaded data between the slice interval adjacent to the newest continuous data and a slice interval next to the slice interval adjacent to the newest continuous data as valid, and to delete the slice interval adjacent to the newest continuous data from the database unit; if not, to insert the returned slice data into the database unit, to set the displaying mark of the returned slice data as valid, and to amend the identifier of the newest piece of data in the slice interval adjacent to the newest continuous data as the identifier of the oldest piece of data in the returned slice data.

According to another aspect of the present disclosure, a method for processing slice data is provided, and the method comprises:

sending, to a server, a download request for a certain amount of slice data adjacent to the newest continuous data in a database, and receiving the slice data returned by the server; wherein, downloaded data, the displaying mark of the data and slice interval set consisting of slice intervals corresponding to slice data are saved in the database, wherein the displaying mark of the newest continuous data is set as valid and the displaying mark of the other data is set as invalid, and displaying the data with the displaying mark being valid;

determining whether or not the slice interval adjacent to the newest continuous data can be filled with the returned slice data;

if yes, inserting the returned slice data into the database and setting the displaying mark of the returned slice data as valid, setting the displaying mark of downloaded data between the slice interval adjacent to the newest continuous data and a slice interval next to the slice interval adjacent to the newest continuous data as valid, and deleting the slice interval adjacent to the newest continuous data from the database;

if not, inserting the returned slice data into the database, setting the displaying mark of the returned slice data as valid, and amending the identifier of the newest piece of data in the slice interval adjacent to the newest continuous data as the identifier of the oldest piece of data in the returned slice data.

According to further another aspect of the present disclosure, a method for downloading data is provided, and the method comprises:

sending a request for downloading new data to a server, and receiving the data returned by the server;

determining whether or not the returned data can link up with data existing in a database;

if yes, saving the returned data in the database, and setting the displaying mark of the returned data as valid;

if not, setting the displaying mark of data, which has been existing in the database with the displaying mark valid, as invalid, and then saving the returned data in the database, and setting the displaying mark of the returned data as valid;

wherein, only data with the displaying mark being valid can be displayed.

According to still another aspect of the present disclosure, a device for downloading data is provided, and the device comprises: a database unit, a display unit, a new data download unit and a database maintenance unit;

the new data download unit is configured to send request for downloading new data to a server, and to receive the data returned by the server;

the database maintenance unit is configured to determine whether or not the returned data can link up with data existing in the database unit; if yes, to save the returned data in the database unit, and to set the displaying mark of the returned data as valid; if not, to set the displaying mark of data, which has been existing in the database unit with the displaying mark being valid, as invalid, and then to save the returned data in the database unit and to set the displaying mark of the returned data as valid;

the database unit is configured to save data and the displaying mark of data;

the display unit is configured to display data with the displaying mark being valid in the database unit.

The beneficial effect of the present disclosure is that:

in the slice data processing scheme of the present disclosure, slice data can be obtained from a server and filled in a corresponding slice interval according to a recorded slice interval set, and the data displayed to a user is always the newest and continuous, thus the problem that a user cannot find out whether or not slice data exists between the displayed data, and cannot obtain the slice data is solved.

Above description is only a summary of the technical scheme of the present disclosure. In order to know the technical means of the present disclosure more clearly so that it can be put into effect according to the content of the description, and to make the aforesaid and other purpose, features and advantages of the disclosure clearer, the embodiments of the disclosure will be described in further detail with reference to the drawings.

BRIEF DESCRIPTION OF THE DRAWINGS

By reading the detailed description of the preferred embodiments below, various other advantages and benefits become clear for a person skilled in the art. The drawings are only used for illustrating preferred embodiments and are not intended to limit the present disclosure. And throughout the drawings, same reference signs are used for representing same components. In the drawings.

DETAILED DESCRIPTION OF THE INVENTION

In the scheme of the present disclosure, in each course of downloading new data, the displaying mark of the data is maintained and slice interval is recorded, and when need of downloading slice data, a corresponding slice data is requested according to the recorded slice interval and the displaying mark of the data is maintained, so that the data being displayed is always the newest and continuous data. Below the technical scheme of the disclosure is divided into two major parts to explain: requesting new data and requesting slice data.

I. Requesting New Data

Figure 1:
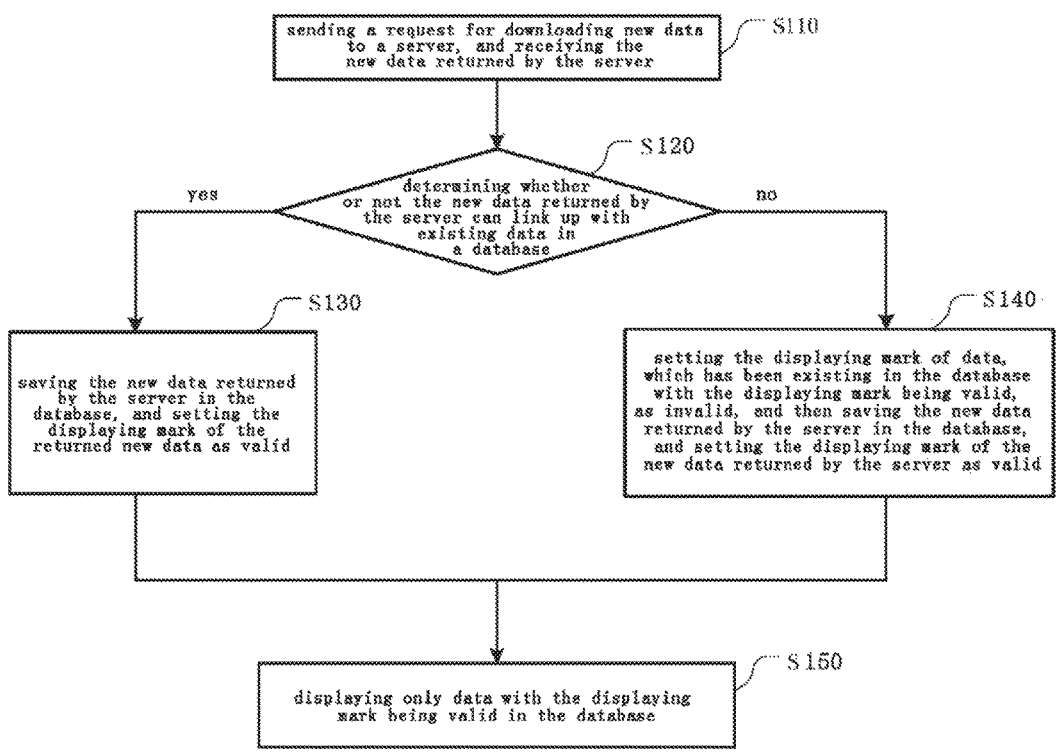
FIG. 1 is a flowchart showing a kind of method for downloading data according to an embodiment of the disclosure.

FIG. 1 is a flowchart showing a kind of new method for downloading data according to an embodiment of the disclosure. As shown in FIG. 1, the method comprises:

Step S110, sending a request for downloading new data to a server, and receiving the new data returned by the server.

In an embodiment of the disclosure, the request for downloading new data sent by the client to the server comprises: the number of pieces of new data requested for downloading and the identifier of the newest piece of data that has been downloaded into the database. Thus, the server regards the data requested by the client as the data from the current newest piece of data in the server to the data identifier contained in the request, and the number of pieces of data requested is the number of pieces contained in the request. Here, "new" and "old" are relative to the time of generating the data, "new" referring to the data generated at later time and "old" referring to the data generated at earlier time.

Step S120, determining whether or not the new data returned by the server can link up with data existing in a database, if yes, proceeding with Step S130; if not, proceeding with step S140.

In an embodiment of the disclosure, if the number of pieces of new data returned by the server is less than the number of pieces of new data requested for downloading, then determined as linked; and if the number of pieces of new data returned by the server is more than or equal to the number of pieces of new data requested for downloading, then determined as not linked. This is because the data returned by the server is based on the number of pieces of data requested for downloading contained in the request for downloading new data sent by the client and the identifier of the newest piece of data that has been downloaded to the database.

Taking identifiers of data sequentially increasing in the order of their generating time as an example: the identifier of the newest piece of data that has been downloaded by the client to the database is 1000, and 20 pieces of data are requested at present. If the identifier of the newest piece of data in the server has reached 1050 when the server receives the request from the client, the server will return 20 pieces of data with identifiers from 1031 to 1050 to the client, and the client will determine as not linked. If the identifier of the newest piece of data in the server has reached 1015 when the server receives the request from the client, the server will return 15 pieces of data with identifiers from 1001 to 1015 to the client, and the client will determine as linked.

Step S130, saving the new data returned by the server in the database, and setting the displaying mark of the returned new data as valid. Proceed with Step S150.

Step S140, setting the displaying mark of data, which has been existing in the database with the displaying mark being valid, as invalid, and then saving the new data returned by the server in the database, and setting the displaying mark of the new data returned by the server as valid. Proceed with step S150.

Step S150, displaying only data with the displaying mark being valid in the database.

In the technical scheme shown in FIG. 1, every time after new data has been requested, it is determined whether or not the new data is linked up with the existing data. When not linked, it means that there is a slice between data. By setting and maintaining the displaying mark of data and displaying only the newest and continuous data, the data that a user reads is continuous data, wherein slice data does not exist. Thus the problem that a user cannot find out whether or not slice data exists between the displayed data is solved.

In the method shown in FIG. 1, when it is determined as not linked in Step S120, the slice internal corresponding to the unlinked slice data is saved in the maintained slice interval set. Specifically, the identifier of the oldest piece of data in the new data returned by the server and the identifier of the newest piece of data that has been downloaded to the database form an array representing a slice interval, and the array is saved in a set of arrays representing the slice interval set. For example, taking what is mentioned afore as an example, that is, the identifier of the newest piece of data that has been downloaded by the client to the database is 1000, and 20 pieces of data are requested at present, and if the identifier of the newest piece of data in the server has reached 1050 when the server receives the request from the client, the server will return 20 pieces of data with identifiers from 1031 to 1050 to the client. The array representing the slice interval corresponding to the unlinked slice data is [1031, 1000]. The two endpoints data 1000 and 1031 of the slice interval [1031, 1000] are not included in the slice data, that is, the corresponding slice data is 1001~1030.

In order to make the technical scheme of the disclosure clearer, the technical scheme of the disclosure will be further described below.

Figure 2:
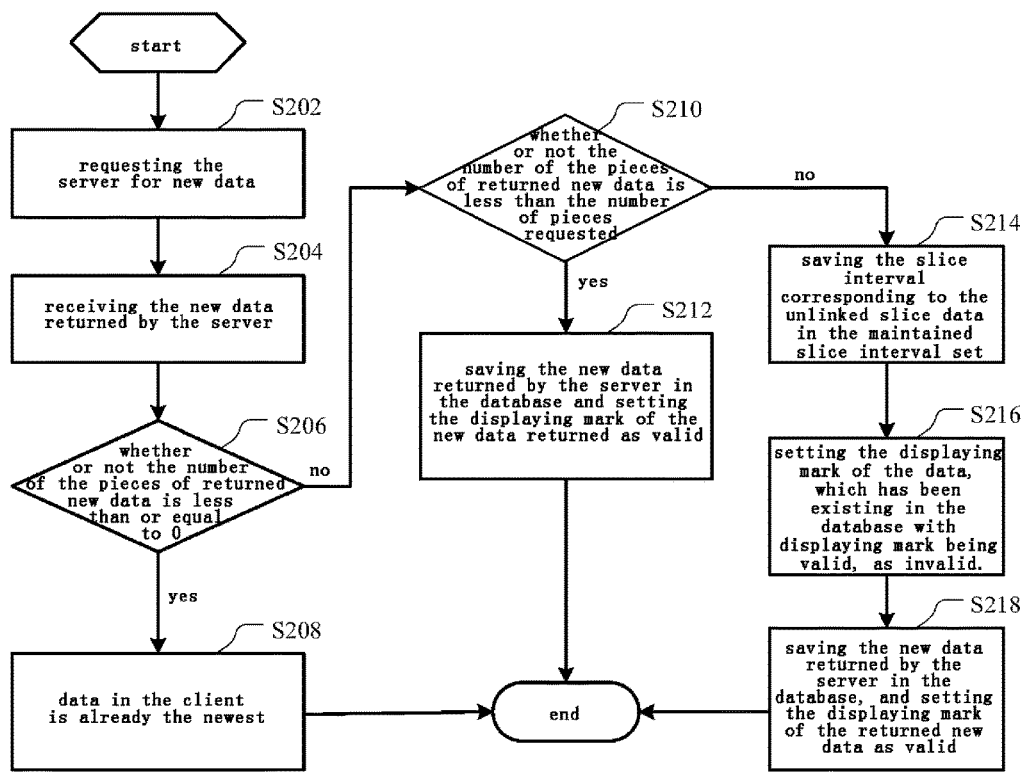
FIG. 2 is a flowchart showing the method for downloading data according to an embodiment of the disclosure.
Figure 3:
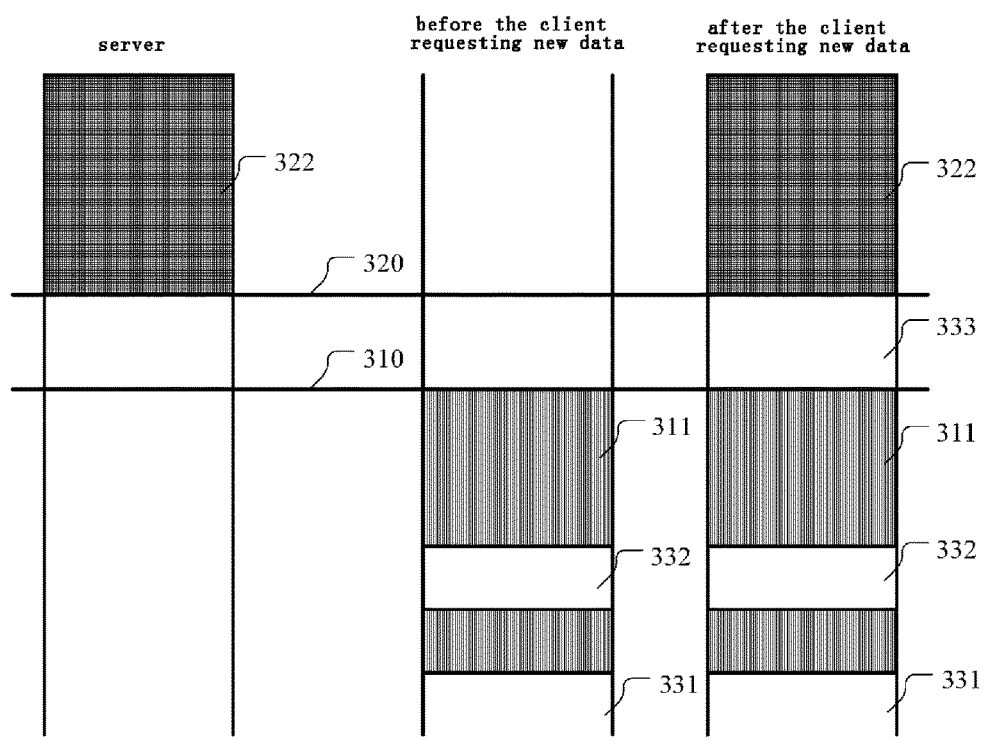
FIG. 3 is a schematic diagram showing data variation of a client in the course of data download according to an embodiment of the disclosure.

FIG. 2 is a flowchart showing the method for downloading data according to an embodiment of the disclosure. FIG. 3 is a schematic diagram showing data variation of a client in the course of data download according to an embodiment of the disclosure. Below expounds the method shown in FIG. 2 in combination with FIG. 3. As shown in FIG. 2, the process of a client requesting new data comprises:

Step S202, the client sending a request for downloading new data to the server.

In an embodiment of the disclosure, the request for downloading new data sent by the client to the server comprises: the number of pieces of new data requested for downloading and the identifier of the newest piece of data that has been downloaded to the database.

First, the client should set "the number of pieces of new data requested for downloading", for example, 20 pieces in general. Besides, the client should obtain the identifier of the newest piece of data in the existing data (i.e. data that has been downloaded to the database of the client), for example, Line 310 in FIG. 3. Aforesaid "the number of pieces of data requested for downloading" and "the identifier of the newest piece of data in the existing data" are saved as a variable for use. Then, the client joints "the number of pieces of data requested for downloading" and "the identifier of the newest piece of data in the existing data" as a URL, requesting the server to download updated data.

Step S204, the client receiving the new data returned by the server.

Here the server will determine how many pieces of data should be returned and which data should be returned according to "the identifier of the newest piece of data in the existing data". In general, "the identifier of the newest piece of data in the existing data" is embodied as "stopping request at the identifier" in the database (e.g. Line 310 in FIG. 3), that is, the interval range of the data to be obtained is "infinity to the identifier of the newest piece of data in the existing data", and the formula is: (∞, the identifier of the newest piece of data in the existing data), and the data designated by the identifier of the newest piece of data in the existing data is not included in the range. Meanwhile, "the number of pieces of data requested for downloading" also serves as a restriction, that is, "the number of pieces of data returned" by the server should be less than or equal to the restriction. Ultimately, the conditions of the data returned by the server are: 1. the number of returned pieces of data should be less than or equal to "the number of pieces of data requested for downloading"; 2. the range of the data to be obtained is (co, the identifier of the newest piece of data in the existing data). The relation of the two conditions is "and".

Step S206, the client determining whether or not the number of the pieces of new data returned by the server is less than or equal to 0. If yes, proceed with step S208; if not, proceed with step S210.

Step S208, if the number of the pieces of new data returned by the server is less than or equal to 0, it means that the identifier of the newest data in the client is the newest data identifier in the server, that is, the data in the client has been updated, and the server does not contain newer data, the client prompting the user that the newest data in the database is the newest in the server, a further request is not needed and the transmission ends.

Step S210, if the number of the pieces of new data returned by the server is more than 0, it means that the server has newer data than the newest data in the client, thus continuing to determine whether or not the new data returned by the server can link up with the existing data in the database, specifically, determining whether or not the number of the pieces of new data returned by the server is less than the number of pieces of new data requested for downloading. If yes, proceed with step S212; if not, proceed with step S214.

Step S212, if the number of the pieces of new data returned by the server is less than the number of pieces of new data requested for downloading, it means that the data returned by the server can link up with the local data in the client, the client saving the new data returned by the server in the database and setting the displaying mark of the new data returned by the server this time as valid. For example, in an embodiment of the disclosure, using a SQL statement INSERT can realizing inserting the data returned by the server in the database. The process ends.

Step S214, if the number of the pieces of new data returned by the server is more than or equal to the number of pieces of new data requested for downloading, it means that the new data returned by the server cannot link up with the local data in the client and there exists slice data, the client saving the slice interval corresponding to the slice data in the maintained slice interval set.

In an embodiment of the disclosure, the client first records the identifier of the oldest piece of data in the data returned by the server and saves it as a variable, in the present embodiment called "identifier of the oldest piece of data in the data returned by the server", as Line 320 shown in FIG. 3. Then, the client saves "the identifier of the newest piece of data in the existing data", as Line 320 shown in FIG. 3, as a variable for use. And then the "set of slice intervals" is fetched from the database (in FIG. 3, two slice intervals are marked as 331 and 332, and the two are combined as the "set of slice intervals"). The "set of slice intervals" is mainly for recording the interval range of each slice, and these slices have not been downloaded to the client, but they should be able to be requested by the client to the server as needed. The purpose of fetching the "set of slice intervals" is to add new slice interval to the set.

In an embodiment of the disclosure, Array List of JAVA Class Library is used for achieving slice interval set. When specified to Android Clients, the practice is to fetch the slice interval set by means of SQLite statement. Because what is fetched is Bytes-type (a character string can also be used for describing a slice interval), the client will transform the record into an Array List object by means of de-serialize technology, which is also a read Object method of Android ObjectInputStream type. And in Array List, every item consists of one-dimensional array of Integer, and every array contains two elements, used for representing two borders of the slice interval respectively. The client makes aforesaid "the identifier of the oldest piece of data in the data returned by the server" and "the identifier of the newest piece of data in the existing data" as two borders of the slice interval, and fill them in the one-dimensional array of new Integer, and then add it to the Array List object, finally serializing it as a Bytes object, which is also a toByteArray( ) of Android ObjectInputStream. Eventually, it is saved back in the database. Hereto, a new slice interval is added into the slice interval set. 333 in FIG. 3 is the newly added slice interval.

Step S216, Setting the displaying mark of the data, which has been existing in the database with displaying mark being valid, as invalid.

That is, the value of displaying mark of the existing data (e.g. data slice 311 in FIG. 3) in the client is changed from 1 (display) to 0 (hide), to make sure that the existing data slice 311 before slice interval 333 will not be displayed in the display interface of the client. The specific practice is: changing the value of displaying mark of all existing data from 1 (display) to 0 (hide) by means of a SQL statement.

Step S218, saving the new data returned by the server in the database, and setting the displaying mark of the new data returned from the server as valid.

The client will insert the data 333 returned previously by the server in the database, and set the value of its displaying mark as 1 (display). Hereto, the whole transmission process ends.

As seen from above, in the technical scheme of the disclosure, by setting and maintaining displaying mark, only the newest continuous data is displayed, so that the user can read continuous data. In addition, slice intervals are recorded, so that corresponding slice data can be requested according to the recorded slice intervals when the user wants to request slice data.

II. Requesting Slice Data

Figure 4:
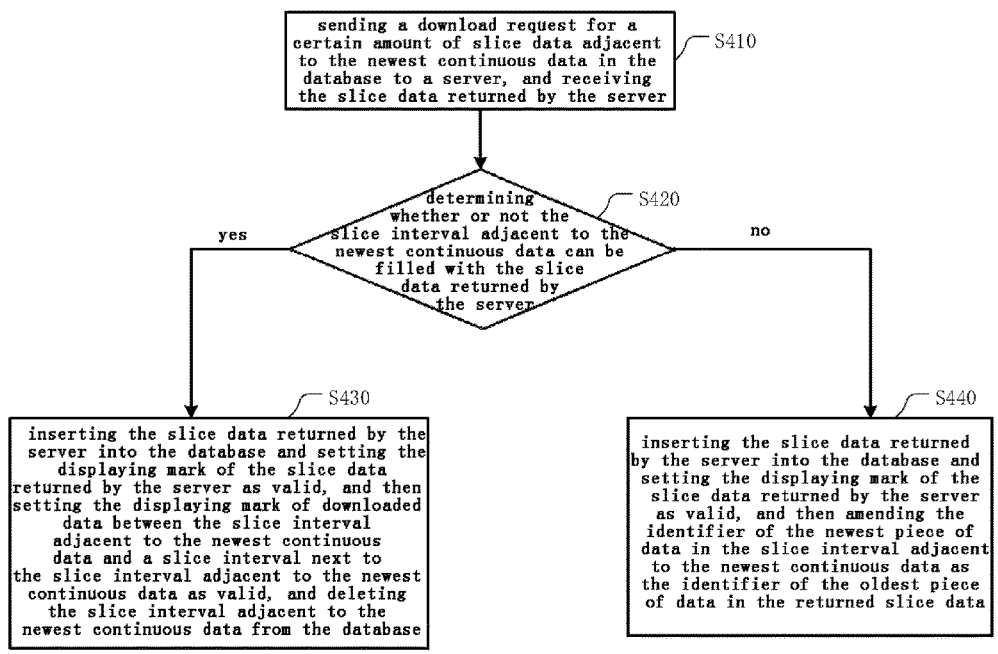
FIG. 4 is a flowchart showing a kind of method for processing slice data according to an embodiment of the disclosure.

FIG. 4 is a flowchart showing a kind of method for processing slice data according to an embodiment of the disclosure. As shown in FIG. 4, the method comprises:

Step S410, sending, to a server, a download request for a certain amount of slice data adjacent to the newest continuous data in the database, and receiving the slice data returned by the server. Wherein, according to aforesaid process of requesting new data, the downloaded data, the displaying mark of the data and slice interval set consisting of slice intervals corresponding to slice data are saved in the database, wherein the displaying mark of the newest continuous data is set as valid and the displaying mark of the other data is set as invalid, and the data with the displaying mark being valid can be displayed.

In an embodiment of the disclosure, the request for downloading slice data sent by the client to the server comprises: the identifier of the oldest piece of reading data in the newest continuous data in the database, the number of pieces of slice data requested for downloading and the identifier of the oldest piece of reading data in the slice data corresponding to the slice interval adjacent to the newest continuous data. Specifically, traverse the slice interval set in the database to find the slice interval adjacent to the identifier of the newest piece of reading data in corresponding slice data and the identifier of the oldest piece of reading data in the newest continuous data, the slice interval is the one that is adjacent to the newest continuous data, and the slice interval is the one that is adjacent to the newest continuous data. Wherein, the slice interval is an array comprising two elements, the first element in the array is the identifier of the newest piece of data in the slice data corresponding to the slice interval; the second element is the identifier of the oldest piece of data in the slice data corresponding to the slice interval.

Step S420, determining whether or not the slice interval adjacent to the newest continuous data can be filled with the slice data returned by the server, if yes, proceeding with step S430; if not, proceeding with step S440.

In an embodiment of the disclosure, if the number of the pieces of slice data returned by the server is more than 0 and less than the number of pieces of the slice data requested for downloading, determine as filled; if the number of the pieces of slice data returned by the server is more than or equal to the number of pieces of the slice data requested for downloading, determine as not filled.

Step S430, inserting the slice data returned by the server into the database and setting the displaying mark of the slice data returned by the server as valid, and then setting the displaying mark of downloaded data between the slice interval adjacent to the newest continuous data and a slice interval next to the slice interval adjacent to the newest continuous data as valid, and deleting the slice interval adjacent to the newest continuous data from the database.

Step S440, inserting the slice data returned by the server into the database and setting the displaying mark of the slice data returned by the server as valid, and then amending the identifier of the newest piece of data in the slice interval adjacent to the newest continuous data as the identifier of the oldest piece of data in the returned slice data.

Thus, by means of the method shown in FIG. 4, the slice data can be obtained according to the recorded slice interval. By repeating the method shown in FIG. 4, the slice data can be obtained sequentially starting from the newest continuous data and be filled in slice intervals, until all the slice intervals are filled.

The condition of triggering a slice data download process is generally: a user sees "the oldest piece of data in the newest continuous data" (it can be considered that in the case of no network, a user can browse these continuous data till the oldest piece of data, and then a slice may occur, or no any older data). In this case, in order to make sure that the old data can be downloaded and seen by the user, there is a need of requesting the server for downloading slice data. The specific process is shown in FIG. 5.

Figure 5:
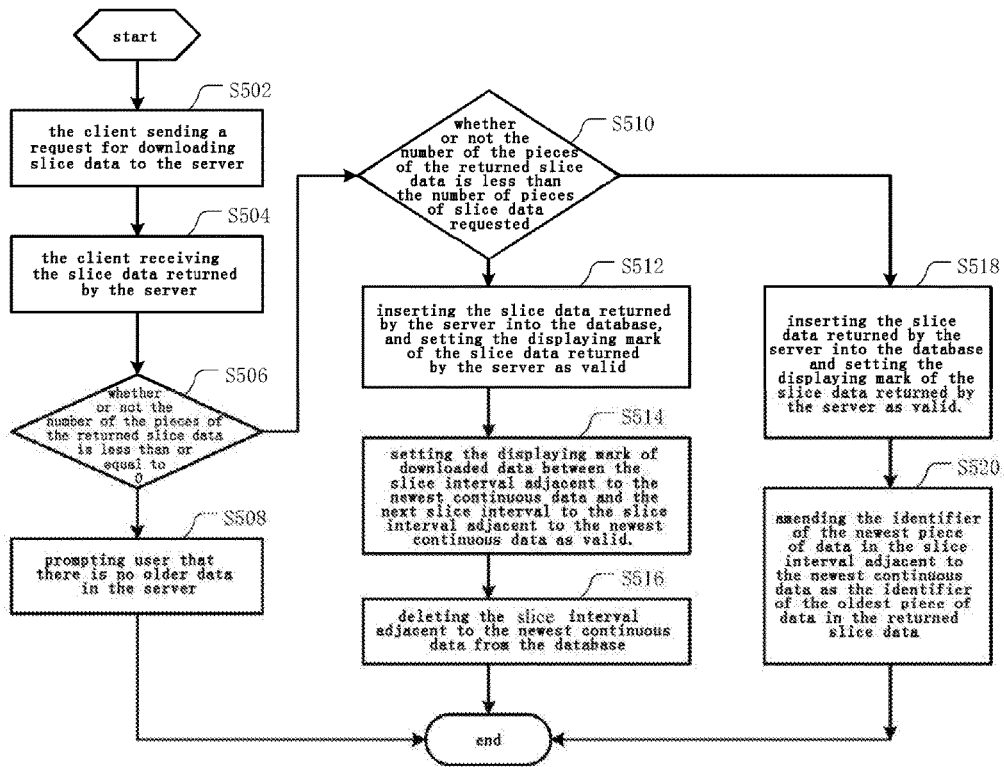
FIG. 5 is a flowchart showing the method for processing slice data according to an embodiment of the disclosure.
Figure 6:
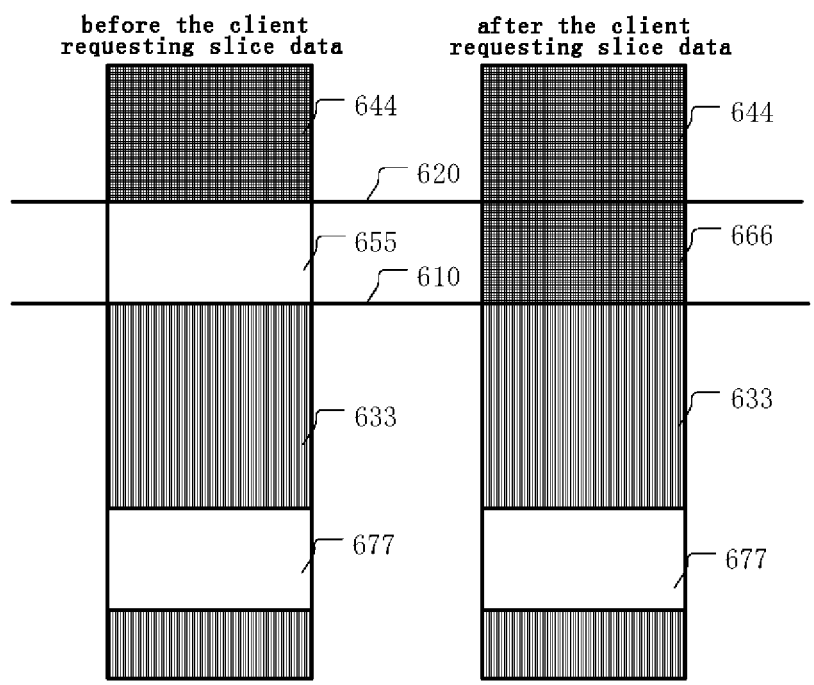
FIG. 6 is a schematic diagram showing that a slice interval can be filled with slice data downloaded at a time according to an embodiment of the disclosure.
Figure 7:
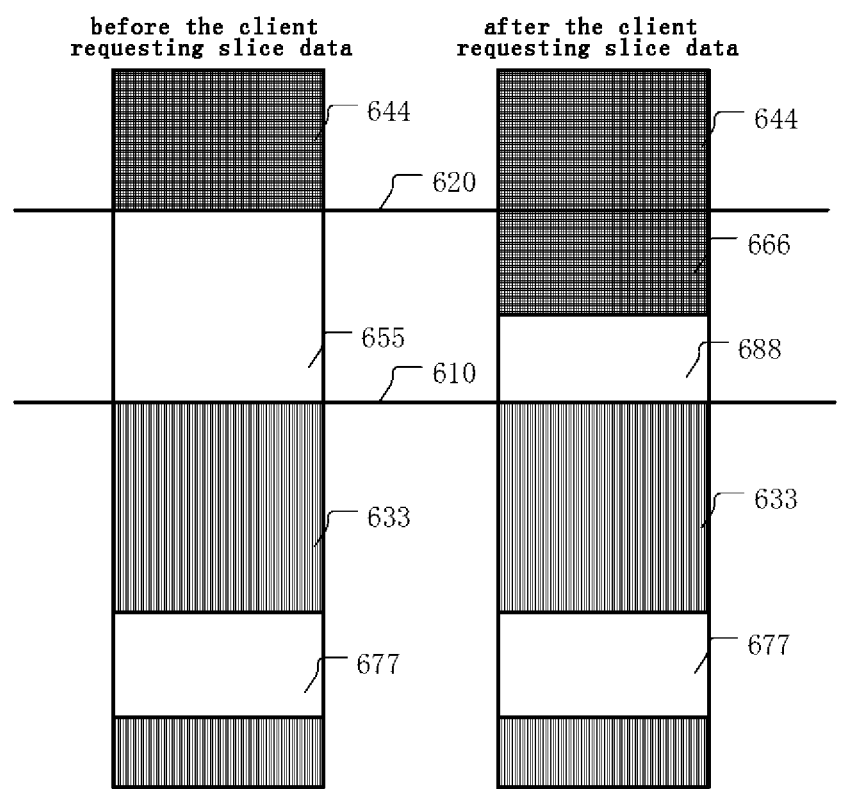
FIG. 7 is a schematic diagram showing that a slice interval cannot be filled with slice data downloaded at a time according to an embodiment of the disclosure.

FIG. 5 is a flowchart showing the method for processing slice data according to an embodiment of the disclosure. FIG. 6 is a schematic diagram showing that a slice interval can be filled with slice data downloaded at a time according to an embodiment of the disclosure. FIG. 7 is a schematic diagram showing that a slice interval cannot be filled with slice data downloaded at a time according to an embodiment of the disclosure. Below expounds the method for processing slice data shown in FIG. 5 in combination with FIG. 6 and FIG. 7. As shown in FIG. 5, the process of a client requesting slice data comprises:

Step S502, the client sending a request for downloading slice data to the server.

In an embodiment of the disclosure, the request for downloading slice data sent by the client to the server comprises: the identifier of the oldest piece of reading data in the newest continuous data in the database, the number of pieces of slice data requested for downloading and the identifier of the oldest piece of reading data in the slice data corresponding to the slice interval adjacent to the newest continuous data.

For example, referring to FIG. 6: first, the client need know the identifier of the oldest piece of reading data in the newest continuous data 644 in the database, i.e. Line 620 in FIG. 6, and save it as a variable for use. Specifically, the identifier of the piece of data can be obtained by means of SQL statement, of which the indication number is smallest and all displaying marks are 1 (display). Meanwhile, the client need know the total number of the pieces of slice data requested. Here, assuming like obtaining new data, no more than 20 pieces of data are obtained at one time, then, "the number of pieces of slice data requested for downloading" is saved as a variable for use. Next, the client need obtain the "slice interval" next to "the identifier of the oldest piece of data in the newest continuous data in the database", hereinafter referred to as "slice interval adjacent to the newest continuous data", i.e. slice interval 655 in FIG. 6, which is also the part between Line 620 and Line 610. Still taking Android system as an example, first the slice set is fetched by means of SQLite statement, and is de-serialized, and the record is transformed into an Array List object. From the first element in Array List (the element added at last) which is a one-dimensional array of Integer and represents a "slice interval". Then, the two boundary values of the "slice interval" are read out, and they locate in the first element and the second element of the array. Here still taking the arrangement of "the article identifiers from new to old in descending order" as an example, the first element is the identifier of the newest piece of data in the slice data corresponding to the slice interval, and the second element is the identifier of the oldest piece of data in the slice data corresponding to the slice interval. Thus, the client has obtained the necessary parameters for requesting slice data: "the identifier of the oldest piece of reading data in the newest continuous data", "the number of pieces of slice data requested for downloading" and "the identifier of the oldest piece of reading data in the slice data corresponding to the slice interval adjacent to the newest continuous data", jointing the above three parameters as a URL, sending a request to the server and waiting for returning a result.

Step S504, the client receiving the slice data returned by the server.

The server will determine how many pieces of data should be returned and which data should be returned according to "the identifier of the oldest piece of reading data in the newest continuous data" and "the identifier of the oldest piece of reading data in the slice data corresponding to the slice interval adjacent to the newest continuous data". In general, "the identifier of the oldest piece of reading data in the newest continuous data" is embodied as "starting from the identifier" in the server, while "the identifier of the oldest piece of reading data in the slice data corresponding to the slice interval adjacent to the newest continuous data" is embodied as "stopping request at the identifier" in the server, that is, the interval range of data to be obtained is the slice interval 655 in FIG. 6, and the data designated by the start identifier and stop identifier is not included in the range. Meanwhile, "the number of pieces of slice data requested for downloading" will serve as a restriction, and "the number of pieces of slice data returned" by the server should be less than or equal to the restriction. Ultimately, the conditions of the slice data returned by the server are: 1. the number of pieces of returned slice data should be less than or equal to the number of pieces of slice data requested for downloading; 2. the range of the data to be obtained is starting from "the identifier of the oldest piece of reading data in the newest continuous data" to "the identifier of the oldest piece of reading data in the slice data corresponding to the slice interval adjacent to the newest continuous data". The relation of the two conditions is "and". Below the slice data returned by the server is marked as 666.

Step S506, determining whether or not the number of the pieces of slice data returned by the server is less than or equal to 0, if yes, proceeding with Step S508; if not, proceeding with Step S510.

Step S508, the client prompting the user that there is no older data in the server, the process ends.

Step S510, determining whether or not the number of the pieces of slice data returned by the server is less than the number of pieces of slice data requested, if yes, proceeding with Step S512; if not, proceeding with Step S518.

This step is determining whether or not the slice interval adjacent to the newest continuous data is filled with the slice data returned by the server at present. Specifically: if the number of the pieces of slice data returned by the server is less than the number of pieces of slice data requested for downloading, it means that the slice can be filled. As shown in FIG. 6, the slice interval 655 can be filled with the slice data 666 returned by the server, and the slice interval can be directly deleted from the slice interval set. On the contrary, if the number of the pieces of slice data returned by the server is more than or equal to the number of pieces of slice data requested for downloading, it means that the slice interval cannot be filled. As shown in FIG. 7, the slice interval 655 cannot be filled with the slice data 666 returned by the server, and the range of the slice interval need be reduced.

Step S512, inserting the slice data returned by the server into the database, and setting the displaying mark of the slice data returned by the server as valid.

Referring to FIG. 6, the slice data 666 returned by the server is inserted into the database, and the slice interval 655 can be precisely filled. And the displaying mark of the inserted slice data 666 is set as valid (setting as 1, display), that is, the newly downloaded data need to be displayed.

Step S514, setting the displaying mark of downloaded data between the slice interval adjacent to the newest continuous data and the next slice interval to the slice interval adjacent to the newest continuous data as valid.

In FIG. 6, the downloaded data between slice interval 655 and the next slice interval 677 is data block 633, that is, the displaying mark of the data in data block 633 is set as valid, so that data block 633, newly downloaded slice data 666 and the original continuous data 644 constitute new continuous data and are all displayed.

Specifically, the client need read "the identifier of the oldest piece of reading data in the slice data corresponding to the slice interval adjacent to the newest continuous data" and "location of the Array List where the slice interval lies in" (hereinafter referred to as "slice location") saved previously, and the latter is mainly used for positioning accurately that slice interval in the list. Then, the client obtains the slice interval 677 next to the present slice interval 655 by means of ArrayList.get (slice location +1). And then, the identifier of the newest piece of data in the slice data corresponding to slice interval 677 is obtained and saved as a variable for use. At last, the client amends the value of displaying mark of the data between "the identifier of the oldest piece of data in the slice data corresponding to slice interval 655" and "the identifier of the newest piece of data in the slice data corresponding to next slice interval 677" from 0 (hide) to 1 (display). Thus, the slice interval will be filled, and the existing articles before the slice interval will link up to the slice data until the next slice.

Step S516, deleting the slice interval adjacent to the newest continuous data from the database. The process ends.

Specifically, delete the slice interval that has been filled in "Array List" object.

Step S518, inserting the slice data returned by the server into the database, and setting the displaying mark of the slice data returned by the server as valid.

Referring to FIG. 7, the slice data 666 returned by the server is inserted into the database, slice interval 655 cannot be filled. And the displaying mark of the inserted slice data 666 is set as valid (setting as 1, display), that is, the newly downloaded data need be displayed. By this time the newest continuous data consist of the newly downloaded slice data 666 and the original data 644.

Step S520, amending the identifier of the newest piece of data in the slice interval adjacent to the newest continuous data as the identifier of the oldest piece of data in the returned slice data. The process ends.

Referring to FIG. 7, before downloading the slice data, the newest continuous data is 644, and the slice interval adjacent to the newest continuous data is 655. After downloading the slice data, the newest continuous data is a combination of 644 and 666, and the slice interval adjacent to the newest continuous data is 688. Thus the range that can be displayed is expanded, and the adjacent slice interval is reduced.

Specifically, after amending the border value of the adjacent slice interval, the slice interval is put back in Array List. In Android operating system, because Java programming language is used and the cached array is pointer type, which means that "adjacent slice interval" object and the object in Array List are associated, there is no need of other operation. Yet in other language, it may also need to be put back to Array List and to cover the original object. Hereto, the transmission process finishes.

Repeating the process shown in FIG. 5, the slice data can be obtained sequentially until all the slice intervals are filled.

Figure 8:
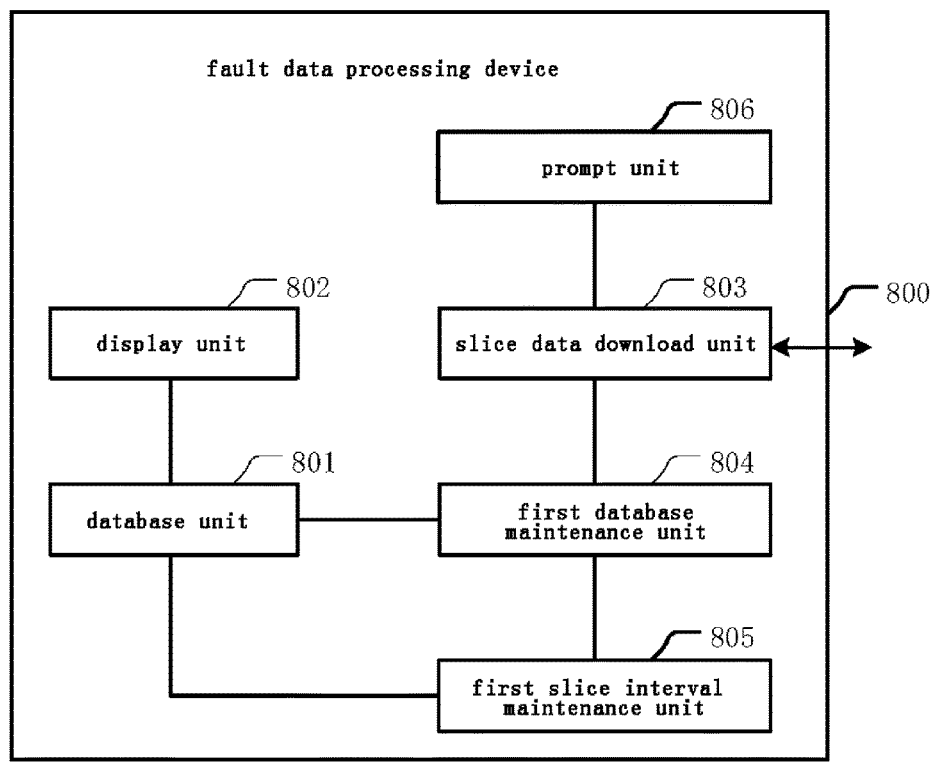
FIG. 8 is a structural diagram showing a kind of device for processing slice data according to an embodiment of the disclosure.

FIG. 8 is a structural diagram showing a kind of device for processing slice data according to an embodiment of the disclosure. As shown in FIG. 8, the device for processing slice data comprises: a database unit 801, a display unit 802, a slice data download unit 803, a first database maintenance unit 804, a first slice interval maintenance unit 805 and a prompt unit 806.

The database unit 801 is configured to save data, display mark of data and slice interval set consisting of slice intervals corresponding to slice data, wherein the displaying mark of the newest continuous data is set as valid, and the displaying mark of other data is set as invalid.

The display unit 802 is configured to display data with the displaying mark being valid in the database unit 801.

The slice data download unit 803 is configured to send, to a server, a download request for a certain amount of slice data adjacent to the newest continuous data in the database unit 801, and to receive the slice data returned by the server.

The first database maintenance unit 804 is configured to determine whether or not the slice interval adjacent to the newest continuous data can be filled with the returned slice data; if yes, to insert the slice data returned by the server into the database unit 801, to set the displaying mark of the slice data returned by the server as valid, and then to set the displaying mark of downloaded data between the slice interval adjacent to the newest continuous data and the next slice interval to the slice interval adjacent to the newest continuous data as valid, and to delete the slice interval adjacent to the newest continuous data from the database unit 801; if not, to insert the slice data returned by the server into the database unit 801, to set the displaying mark of the slice data returned by the server as valid, and then to amend the identifier of the newest piece of data in the slice interval adjacent to the newest continuous data as the identifier of the oldest piece of data in the returned slice data.

In an embodiment of the disclosure, the request for downloading slice data sent by the slice data download unit 803 to the server comprises: the identifier of the oldest piece of reading data in the newest continuous data, the number of pieces of slice data requested for downloading and the identifier of the oldest piece of reading data in the slice data corresponding to the slice interval adjacent to the newest continuous data. The first database maintenance unit 804 is further configured to determine that the slice interval is filled if the number of the pieces of slice data returned by the server is more than 0 and less than the number of pieces of the slice data requested for downloading, and determine that the slice interval is not filled if the number of the pieces of slice data returned by the server is more than or equal to the number of pieces of the slice data requested for downloading.

The first slice interval maintenance unit 805 is configured to traverse the slice interval set in the database unit 801 to find the slice interval adjacent to the identifier of the newest piece of reading data in corresponding slice data and the identifier of the oldest piece of reading data in the newest continuous data, the slice interval is the one that is adjacent to the newest continuous data.

In an embodiment of the disclosure, a slice interval in the slice interval set saved in the database unit 801 is an array comprising two elements. The first element in the array is the identifier of the newest piece of data in the slice data corresponding to the slice interval; the second element is the identifier of the oldest piece of data in the slice data corresponding to the slice interval.

In an embodiment of the disclosure, the slice interval set saved in the database unit 801 is achieved by Array List of JAVA Class Library.

The prompt unit 806 is configured to prompt the user that there is no older data in the server when the number of pieces of slice data returned by the server received by the slice data download unit 803 is 0.

Figure 9:
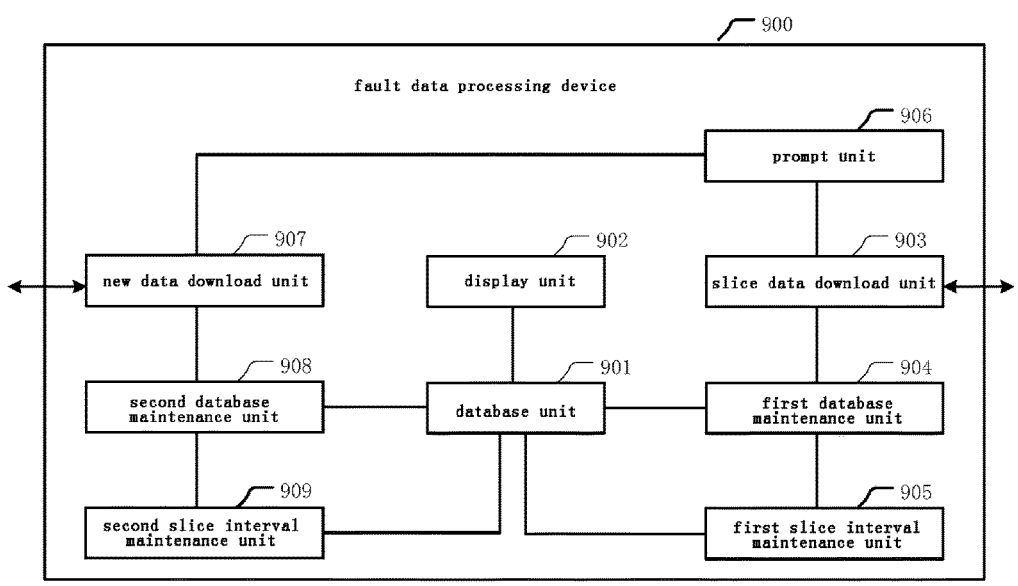
FIG. 9 is a structural diagram showing the device for processing slice data according to an embodiment of the disclosure.

FIG. 9 is a structural diagram showing the device for processing slice data according to an embodiment of the disclosure. As shown in FIG. 9, the device for processing slice data 900 comprises: a database unit 901, a display unit 902, a slice data download unit 903, a first database maintenance unit 904, a first slice interval maintenance unit 905 and a prompt unit 906. In addition, it also comprises: a new data download unit 907, a second database maintenance unit 908 and a second slice interval maintenance unit 909.

The new data download unit 907 is configured to send a request for downloading new data to a server, and to receive the new data returned by the server. In an embodiment of the disclosure, the request for downloading new data sent by the new data download unit 907 to the server comprises: the number of pieces of new data requested for downloading and the identifier of the newest piece of data that has been downloaded to the database.

The second database maintenance unit 908 is configured to determine whether or not the new data returned by the server can link up with the existing data in the database unit 901; if yes, to save the new data returned by the server in the database unit 901, and to set the displaying mark of the data returned by the server as valid; if not, to set the displaying mark of the existing data, with the displaying mark being valid in the database unit 901, as invalid, and then to save the new data returned by the server in the database unit 901, and to set the displaying mark of the new data returned by the server as valid.

The database unit 901 is configured to save data and the displaying mark of the data and slice interval set consisting of slice intervals corresponding to slice data, wherein the displaying mark of the newest continuous data is set as valid, and the displaying mark of other data is set as invalid.

The display unit 902 is configured to display data with the displaying mark being valid in the database unit 901.

In an embodiment of the disclosure, the request for downloading new data sent by the new data download unit 907 to the server comprises: the number of pieces of data requested for downloading and the identifier of the newest piece of data that has been downloaded to the database unit 901. The conditions of the data returned by the server are: 1. the number of pieces of the returned data should be less than or equal to "the number of pieces of new data requested for downloading"; 2. the range of the data to be obtained is (∞, the identifier of the newest piece of data that has been downloaded to the database unit 901). The relation of the two conditions is "and". The second database maintenance unit 908 is configured to determine linked when the number of pieces of the new data returned by the server is less than the number of pieces of the new data requested for downloading, and determine not linked when the number of pieces of new data returned by the server is more than or equal to the number of pieces of the new data requested for downloading.

The second slice interval maintenance unit 909 is configured to, when the new data returned by the server is not linked up with the existing data in the database unit 901, save the slice internal corresponding to the unlinked slice data in the slice interval set maintained in the database unit 901. Specifically, the second slice interval maintenance unit 909 forms an array representing a slice interval by using the identifier of the oldest piece of data in the data returned by the server and the identifier of the newest piece of data that has been downloaded to the database unit 901, and the array is saved in a set of arrays, representing the slice interval set, in the database unit 901.

In an embodiment of the disclosure, the slice interval set saved in the database unit 901 is achieved by Array List of JAVA Class Library.

The prompt unit 906 is configured to prompt the user that the newest data in the database is the newest data in the server when the number of pieces of new data returned by the server to the new data download unit 907 is 0.

The slice data download unit 903 is configured to send, to a server, a download request for a certain amount of slice data adjacent to the newest continuous data in the database unit 901, and to receive the slice data returned by the server.

The first database maintenance unit 904 is configured to determine whether or not the slice interval adjacent to the newest continuous data is filled with the slice data returned by the server; if yes, to insert the slice data returned by the server into the database unit 901, to set the displaying mark of the slice data returned by the server as valid, and then to set the displaying mark of downloaded data between the slice interval adjacent to the newest continuous data and the next slice interval to the slice interval adjacent to the newest continuous data as valid, and to delete the slice interval adjacent to the newest continuous data from the database unit 901; if not, to insert the slice data returned by the server into the database unit 901, to set the displaying mark of the slice data returned by the server as valid, and then to amend the identifier of the newest piece of data in the slice interval adjacent to the newest continuous data as the identifier of the oldest piece of data in the returned slice data.

In an embodiment of the disclosure, the request for downloading sent by the slice data download unit 903 to the server comprises: the identifier of the oldest piece of reading data in the newest continuous data, the number of pieces of slice data requested for downloading and the identifier of the oldest piece of reading data in the slice data corresponding to the slice interval adjacent to the newest continuous data. The first database maintenance unit 904 is further configured to determine that the slice interval is filled when the number of the pieces of slice data returned by the server is more than 0 and less than the number of pieces of the slice data requested for downloading, and to determine that the slice interval is not filled when the number of the pieces of slice data returned by the server is more than or equal to the number of pieces of the slice data requested for downloading.

The first slice interval maintenance unit 905 is configured to traverse the slice interval set in the database unit 901 to find the slice interval adjacent to the identifier of the newest piece of reading data in corresponding slice data and the identifier of the oldest piece of reading data in the newest continuous data, the slice interval is the one that is adjacent to the newest continuous data In an embodiment of the disclosure, a slice interval in the slice interval set saved in the database unit 901 is an array comprising two elements. The first element in the array is the identifier of the newest piece of data in the slice data corresponding to the slice interval; the second element is the identifier of the oldest piece of data in the slice data corresponding to the slice interval.

The prompt unit 906 is configured to prompt the user that there is no older data in the server when the number of pieces of slice data returned by the server received by the slice data download unit 903 is 0.

In summary, in the device for processing slice data of the present disclosure, by setting and maintaining the displaying mark, only the newest continuous data is displayed, so that the data that the user can read is continuous data. In addition, the slice interval is recorded, so that the slice data can be obtained from the server and filled in the corresponding slice interval according to the recorded slice interval set, which is convenient for the user.

It should be noted that the embodiments in the disclosure and the features in the embodiments can be combined with one another arbitrarily if there are not conflicts among them.

The various components in the embodiments of the present disclosure can be realized by hardware, or realized by software modules operating on one or more processors, or realized by combination thereof. A person skilled in the art should understand that microprocessor or digital signal processor (DSP) can be used for realizing some or all functions of some or all components of website searching system in the present disclosure in practice. The present disclosure can also be realized as program of device or apparatus (for example, computer program and computer program product) that is used for carrying out a part or all of the method described here. Such program for realizing the present disclosure can be stored in computer readable medium, or can be in form of one or more signals. Such signals can be downloaded from the Internet website or be provided by carrier signals, or be provided in any other forms.

Figure 10:
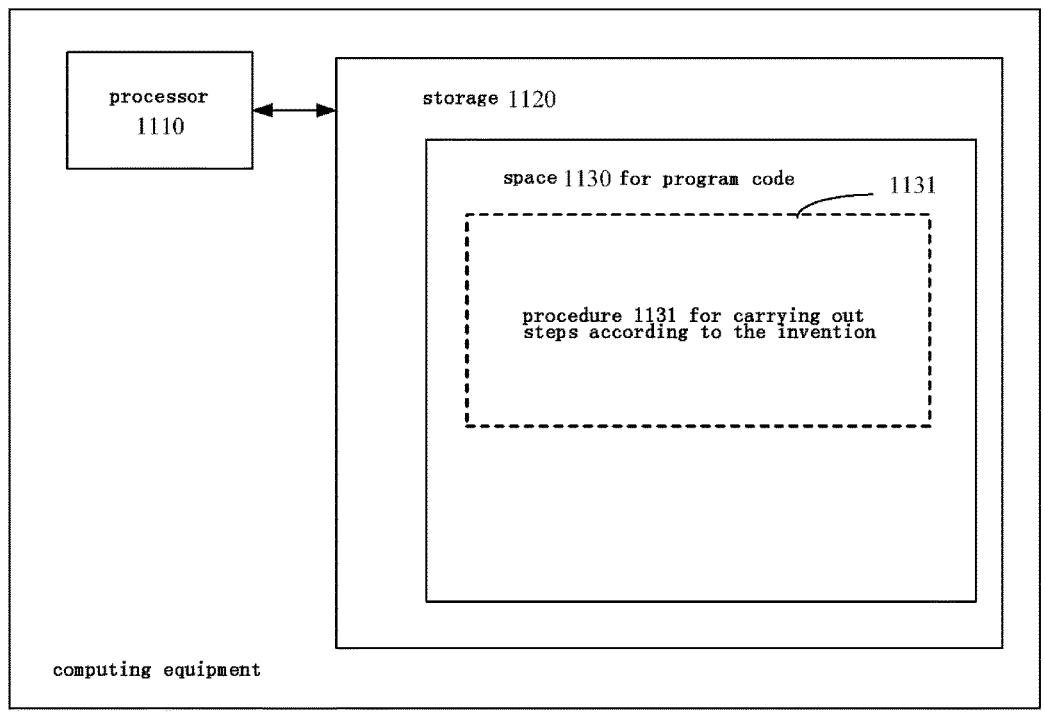
FIG. 10 is a block diagram schematically showing a server used for carrying out a method according to the disclosure.
Figure 11:
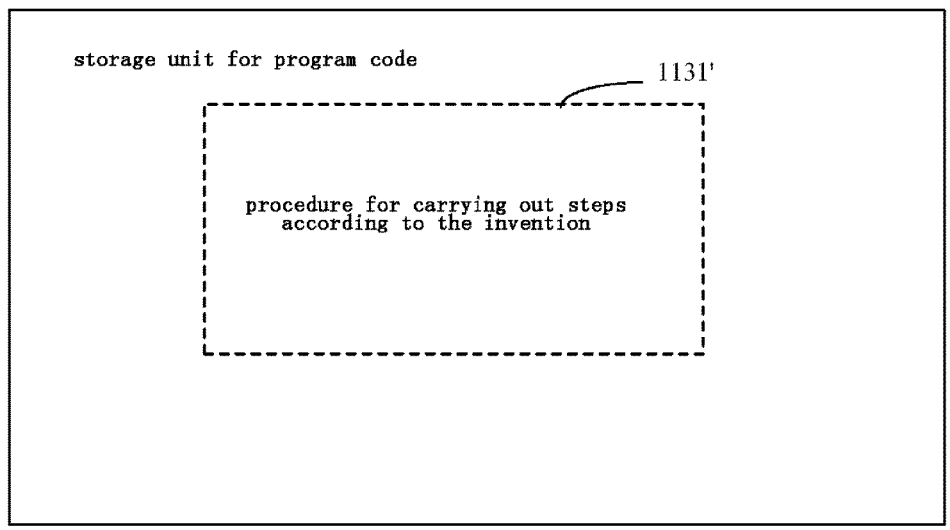
FIG. 11 schematically shows a storage unit used for maintaining or carrying program code for achieving a method according to the disclosure.

For example, FIG. 10 shows a computing device for implementing the method for processing slice data or downloading data according to the disclosure, e.g. mobile terminal. The computing device traditionally comprises a processor 1110 and computer program product or computer readable medium in the form of storage 1120. Storage 1120 can be electronic storage such as flash, Electrically Erasable Programmable Read—Only Memory (EEPROM), EPROM, hard disk or ROM. Storage 1120 possesses storage space 1130 for storing program codes 1131 carrying out any step of aforesaid method. For example, storage space 1130 for the program codes can contain various program codes used for realizing the steps of aforesaid method. These program codes can be read out from one or more computer program products or be written in one or more computer program products. These computer program products comprise program code carriers such as hard disk, Compact Disc (CD), memory card or floppy disk. Such computer program products usually are portable or fixed storage unit as shown in FIG. 11. The storage unit can contain memory slices, storage space arranged like in the storage 1120 in the computing device in FIG. 10. The program codes can be compressed in, for example, a proper form. Generally, the storage unit contains computer readable codes 1131', i.e. the codes can be read by a processor such as 1110. When the codes operate on a computer device, the computer device will carry out various steps of the method described above.

The "an embodiment", "embodiments" or "one or more embodiments" referred here mean that the specific feature, structure or characteristic described in combination with the embodiments is included in at least one embodiment in the present disclosure. In addition, please note that the phrase "in an embodiment" not necessarily mean a same embodiment.

The description provided here has illustrated a lot of specific details. However, it should be understood that the embodiments of the disclosure can be practiced without these specific details. In some embodiments, the well known methods, structures and techniques are not presented in detail, so that the description will not be obscure to understand.

It should be noted that the forgoing embodiments are intended to illustrate the present disclosure and are not limit this disclosure, and a person skilled in the art can design alternative embodiments without departing from the scope of the appended claims. In the claims, any reference signs between brackets should not be constructed as limit for the claims. The word "comprise" does not exclude elements or steps that are not listed in the claims. The word "a" or "an" before the element does not exclude that more such elements exist. The present disclosure can be realized by means of hardware comprising several different elements and by means of properly programmed computer. In the device claims listing several units, some of the units can be embodied by a same hardware. The use of words first, second and third does not mean any sequence. These words can be explained as name.

In addition, it should be noted that the language used in the description is chosen for the purpose of readability and teaching, instead of for explaining or limiting the subject of the present disclosure. Therefore, it is obvious for a person skilled in the art to make a lot of modification and alteration without departing from the scope and spirit of the appended claims. As for the scope of the disclosure, the disclosure of the disclosure is illustrative instead of restrictive. The scope of the present disclosure is defined by the appended claims.

What is claimed:

1. A device for downloading data, comprising:
a memory having instructions stored thereon; and
at least one processor to execute the instructions to perform operations for downloading data, the operations comprising:
sending, to a server, a request for downloading new data, and receiving the data returned by the server, the request for downloading new data including a number of pieces of new data requested for downloading and an identifier of a newest piece of data that has been downloaded to a database;
saving the returned data in the database and setting a displaying mark of the returned data as valid;
determining whether or not the returned data links up with existing data that existed in the database prior to saving the returned data, by determining that the returned data links up with the existing data in the database when an identifier of the returned data and an identifier of the existing data are in sequence and a number of pieces of the returned data is less than the number of pieces of data requested for downloading, and determining that the returned data does not link up with the existing data in the database when the identifier of the returned data and the identifier of the existing data are not in sequence or the number of pieces of the returned data is greater than or equal to the number of pieces of data requested for downloading;

if the returned data does not link up with the existing data, setting a displaying mark of the existing data that was previously valid, as invalid, and saving a slice interval corresponding to unlinked slice data in a slice interval set maintained in the database; and displaying the returned data with the displaying mark.

2. The device according to claim 1, wherein saving the slice interval corresponding to the unlinked slice data in the slice interval set maintained in the database comprises:

forming an array representing a slice interval by using an identifier of the oldest piece of data in the returned data and an identifier of the newest piece of data that has been downloaded to the database, and saving the array in a set of arrays representing the slice interval set in the database.

3. The device according to claim 2, wherein the slice interval set in the database is achieved by Array List of a Java programming language class library.

4. The device according to claim 1, wherein the operations further comprise:

prompting a user that newest data in the database is newest data in the server when a number of pieces of data returned by the server is 0.

5. A method for downloading data, comprising:

sending a request for downloading new data to a server, and receiving the data returned by the server, the request for downloading new data including a number of pieces of new data requested for downloading and an identifier of a newest piece of data that has been downloaded to a database;

saving the returned data in the database and setting a displaying mark of the returned data as valid;

determining whether or not the returned data links up with existing data that existed in the database prior to saving the returned data, by determining that the returned data links up with the existing data in the database when an identifier of the returned data and an identifier of the existing data are in sequence and a number of pieces of the returned data is less than the number of pieces of data requested for downloading, and determining that the returned data does not link up with the existing data in the database when the identifier of the returned data and the identifier of the existing data are not in sequence or the number of pieces of the returned data is greater than or equal to the number of pieces of data requested for downloading; and if the returned data does not link up with the existing data, setting a displaying mark of the existing data that was previously valid, as invalid, and saving a slice interval corresponding to unlinked slice data in a maintained slice interval set;

wherein only data having a valid displaying mark is displayed.

6. The method according to claim 5, wherein saving the slice interval corresponding to the unlinked slice data in the maintained slice interval set comprises:

forming an array representing a slice interval by using an identifier of the oldest piece of data in the returned data and an identifier of the newest piece of data that has been downloaded to the database, and saving the array in a set of arrays representing the slice interval set.

7. The method according to claim 6, wherein the method further comprises:

achieving the slice interval set by Array List of a programming language class library.

8. The method according to claim 5, wherein the method further comprises:

prompting a user that newest data in the database is newest data in the server if received number of pieces of data returned by the server is 0.

9. A non-transitory computer-readable medium, having instructions stored thereon that, when executed by at least one processor, cause the at least one processor to perform operations for downloading data, the operations comprising:

sending a request for downloading new data to a server, and receiving the data returned by the server, the request for downloading new data including a number of pieces of new data requested for downloading and an identifier of a newest piece of data that has been downloaded to a database;

saving the returned data in the database and setting a displaying mark of the returned data as valid;

determining whether or not the returned data links up with existing data that existed in the database prior to saving the returned data, by determining that the returned data links up with the existing data in the database when an identifier of the returned data and an identifier of the existing data are in sequence and a number of pieces of the returned data is less than the number of pieces of data requested for downloading, and determining that the returned data does not link up with the existing data in the database when the identifier of the returned data and the identifier of the existing data are not in sequence or the number of pieces of the returned data is greater than or equal to the number of pieces of data requested for downloading; and if the returned data does not link up with the existing data, setting a displaying mark of the existing data that was previously valid, as invalid, and saving a slice interval corresponding to unlinked slice data in a maintained slice interval set;

wherein only data having a valid displaying mark is displayed.

* * * * *